United States Patent
Fay et al.

(10) Patent No.: US 11,452,260 B2
(45) Date of Patent: Sep. 27, 2022

(54) AGRICULTURAL VEHICLE WITH ADJUSTABLE LIFT HEIGHT BASED ON HEADER IDENTIFICATION

(71) Applicant: CNH Industrial America LLC, New Holland, PA (US)

(72) Inventors: Jeffrey B. Fay, Oxford, PA (US); Mary Beth Sullivan, Lititz, PA (US); Gregory T. Fasick, Hatfield, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/438,285

(22) PCT Filed: Mar. 10, 2020

(86) PCT No.: PCT/US2020/021867
§ 371 (c)(1),
(2) Date: Sep. 10, 2021

(87) PCT Pub. No.: WO2020/185764
PCT Pub. Date: Sep. 17, 2020

(65) Prior Publication Data
US 2022/0039317 A1    Feb. 10, 2022

Related U.S. Application Data

(60) Provisional application No. 62/816,393, filed on Mar. 11, 2019.

(51) Int. Cl.
*A01D 41/14*    (2006.01)
*A01B 63/00*    (2006.01)
(Continued)

(52) U.S. Cl.
CPC .......... *A01D 41/141* (2013.01); *A01B 63/008* (2013.01); *A01B 63/10* (2013.01);
(Continued)

(58) Field of Classification Search
CPC .. A01D 41/141; A01D 41/145; A01D 34/006; A01D 34/008; A01B 63/08; A01B 63/10
See application file for complete search history.

(56) References Cited

U.S. PATENT DOCUMENTS 5,359,836 A * 11/1994 Zeuner ................. A01D 41/141
                                                       56/10.2 E
5,704,200 A * 1/1998 Chmielewski, Jr. ........................
                                                       A01D 41/141
                                                       56/10.2 E (Continued)

FOREIGN PATENT DOCUMENTS

EP    1721509 A2    11/2006
EP    1985170 A1    10/2008
(Continued)

OTHER PUBLICATIONS

International Search Report and Written Opinion for PCT Application No. PCT/US2020/021867 dated Jul. 10, 2020 (12 pages).

*Primary Examiner* — Arpad Fabian-Kovacs
(74) *Attorney, Agent, or Firm* — Peter Zacharias; Patrick Sheldrake (57) ABSTRACT

An agricultural vehicle includes a chassis (16), a lift arm (18) movably coupled to the chassis (16), a lift actuator (21) coupled to the lift arm (18), a header (14) coupled to the lift arm (18), and a controller (120) operably coupled to the lift actuator (21). The controller (120) is configured to: receive a header type signal corresponding to a header type of the header; define a lift height limit of the header based at least partially on the received header type signal, the lift height limit being a first height limit when a first header type signal is received or a second height limit when a second header type signal is received; and output a lift signal to the lift actuator (21) to vertically displace the header (14). Header vertical displacement is limited to the first height limit if the (Continued)

first header type signal is received or the second height limit if the second header type signal is received.

20 Claims, 11 Drawing Sheets

(51) Int. Cl.
*A01B 63/10* (2006.01)
*A01D 34/00* (2006.01)

(52) U.S. Cl.
CPC .......... *A01D 41/145* (2013.01); *A01D 34/006* (2013.01); *A01D 34/008* (2013.01)

(56) References Cited

U.S. PATENT DOCUMENTS

| | | | |
|---|---|---|---|
| 6,519,923 B1* | 2/2003 | Cooksey | A01B 71/08 56/14.9 |
| 6,675,568 B2* | 1/2004 | Patterson | A01D 41/14 56/208 |
| 8,155,844 B2* | 4/2012 | Peters | B66F 9/22 701/50 |
| 8,245,489 B2* | 8/2012 | Talbot | A01D 41/141 56/10.2 E |
| 9,554,509 B2 | 1/2017 | Bischoff | |
| 9,807,926 B2 | 11/2017 | Wilken et al. | |
| 9,968,033 B2* | 5/2018 | Dunn | A01D 41/141 |
| 10,681,865 B2* | 6/2020 | Dunn | A01D 41/141 |
| 11,116,133 B2* | 9/2021 | Karst | A01D 41/06 |
| 2013/0305674 A1* | 11/2013 | Patterson | A01D 43/077 56/10.2 A |
| 2016/0316624 A1* | 11/2016 | Ritter | A01D 41/141 |
| 2017/0049045 A1* | 2/2017 | Wilken | A01D 41/06 |
| 2018/0271015 A1 | 9/2018 | Redden et al. | |
| 2019/0230857 A1* | 8/2019 | Thomson | A01D 41/145 |
| 2019/0261554 A1 | 8/2019 | Foster et al. | |

FOREIGN PATENT DOCUMENTS

| | | |
|---|---|---|
| EP | 2018981 A1 | 1/2009 |
| EP | 2733680 A1 | 5/2014 |

* cited by examiner

AGRICULTURAL VEHICLE WITH ADJUSTABLE LIFT HEIGHT BASED ON HEADER IDENTIFICATION

FIELD OF THE INVENTION

The present invention pertains to an agricultural vehicle and, more specifically, to an agricultural windrower or other agricultural vehicle incorporating an agricultural header.

BACKGROUND OF THE INVENTION

Self-propelled windrowers are utilized by farmers to cut crop material as the windrower advances across a field and arrange the cut crop material into windrows, which are deposited onto the field behind the windrower to dry. Typical windrowers have a header at the front which will cut the crop material and are driven by a pair of primary wheels linked to one or more wheel drivers, such as an internal combustion engine and/or hydraulic pumps. The windrower can also include a pair of caster wheels at the rear of the windrower.

During operation, the header may be raised to various different heights. The header height may be adjusted by, for example, raising or lowering a pair of lift arms that are connected to the header. The lift arms can be raised or lowered using one or more lift actuators, such as cylinders. An operator may wish to lift the header to, for example, make a turn at the end of a row to clear headlands, or compensate for objects in the field or other operating conditions. In certain instances, it is difficult or inconvenient for a user to know what the specified header height should be to efficiently and safely operate the agricultural vehicle.

What is needed in the art is a windrower or other agricultural vehicle that assists a user with controlling the height of the header.

SUMMARY OF THE INVENTION

Exemplary embodiments disclosed herein provide an agricultural vehicle with a controller that can define different lift height limits of a header based at least partially on the specific type of the header.

In some exemplary embodiments provided in accordance with the present disclosure, an agricultural vehicle includes a chassis, at least one lift arm movably coupled to the chassis, at least one lift actuator coupled to the at least one lift arm and configured to vertically displace the at least one lift arm, a header coupled to the at least one lift arm such that vertical displacement of the at least one lift arm vertically displaces the header, and a controller operably coupled to the at least one lift actuator. The controller is configured to: receive a header type signal corresponding to a header type of the header, the received header type signal being one of a plurality of header type signals including at least a first header type signal and a second header type signal; define a lift height limit of the header based at least partially on the received header type signal, the defined lift height limit being a first height limit when the first header type signal is received or a second height limit when the second header type signal is received, the second height limit being greater than the first height limit; and output a lift signal to the at least one lift actuator to vertically displace the header. Vertical displacement of the header is limited to the first height limit if the first header type signal is received or to the second height limit if the second header type signal is received.

In some exemplary embodiments, a method of adjusting a header height of a header of an agricultural vehicle is provided. The agricultural vehicle includes a chassis, at least one lift arm movably coupled to the chassis and the header, at least one lift actuator coupled to the at least one lift arm, and a controller operably coupled to the at least one lift actuator. The method is performed by the controller and includes: receiving a header type signal corresponding to a header type of the header, the received header type signal being one of a plurality of header type signals including at least a first header type signal and a second header type signal; defining a lift height limit of the header based at least partially on the received header type signal, the defined lift height limit being a first height limit when the first header type signal is received or a second height limit when the second header type signal is received, the second height limit being greater than the first height limit; and outputting a lift signal to the at least one lift actuator to vertically displace the header. Vertical displacement of the header is limited to the first height limit if the first header type signal is received or to the second height limit if the second header type signal is received.

A possible advantage that may be realized by exemplary embodiments provided in accordance with the present disclosure is that providing a controller that defines different lift height limits based at least partially on the header type eliminates the need for a user to remember what the height limits should be for each header type, which can reduce the risk of improper settings and associated inefficient operation.

Another possible advantage that may be realized by exemplary embodiments provided in accordance with the present disclosure is that the user may customize the lift height limit, if desired.

Yet another possible advantage that may be realized by exemplary embodiments provided in accordance with the present disclosure is that the controller can automatically signal for the lift actuator(s) to raise the header to a specified lift height, which is convenient for a user.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
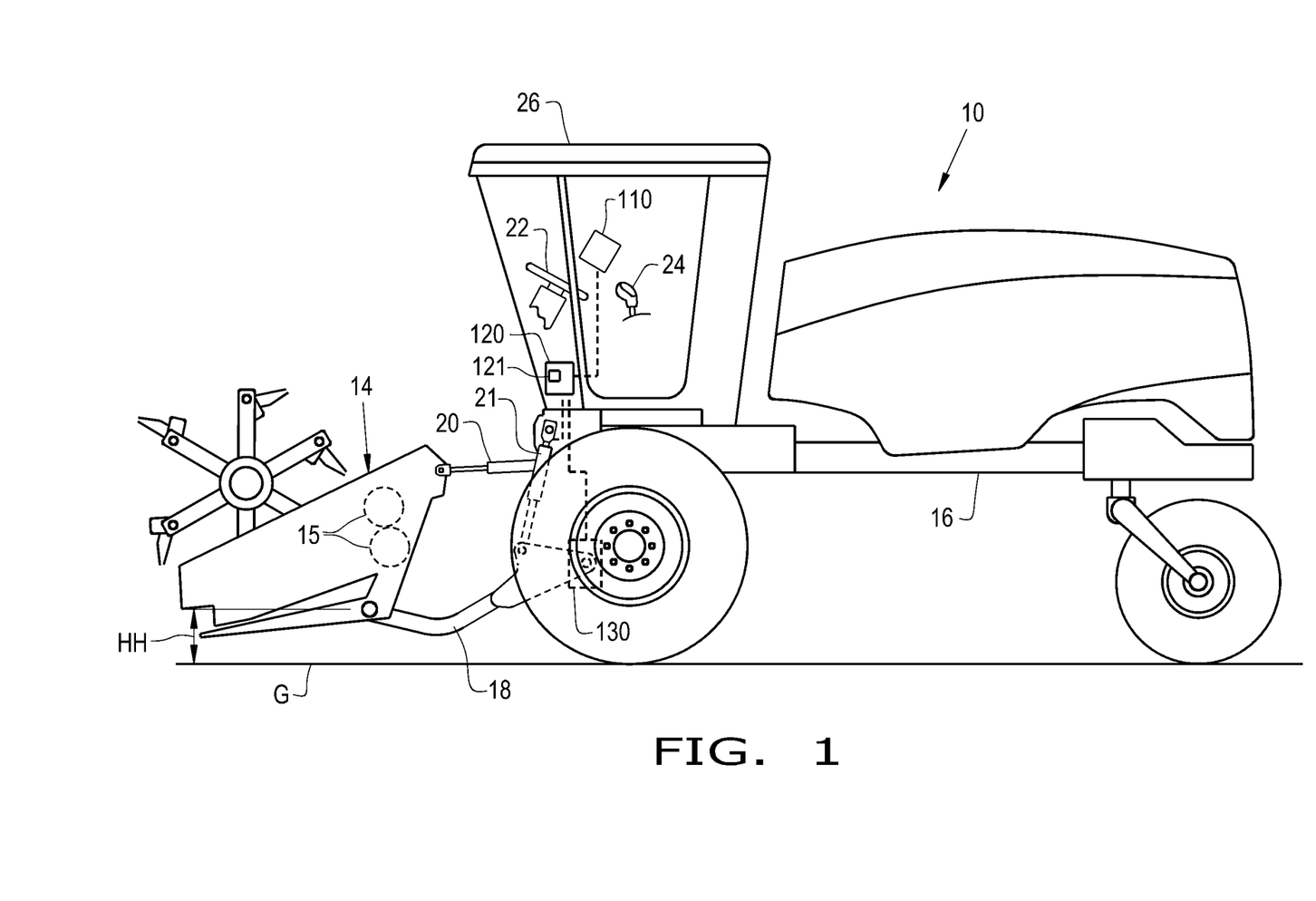
FIG. 1 illustrates a side view of an exemplary embodiment of an agricultural vehicle in the form of a windrower, the windrower comprising a header and a controller for adjusting a lift height of the header, in accordance with an exemplary embodiment of the present invention.

Referring now to the drawings, and more particularly to FIG. 1, an exemplary embodiment of an agricultural vehicle 10 in the form of a self-propelled windrower is illustrated. The windrower 10 includes a chassis 16 and a header 14 carried by the chassis 16 at a front of the windrower 10. It should be appreciated that while the exemplary embodiment of the agricultural vehicle 10 is illustrated and described as a windrower, the agricultural vehicle can be other types of vehicles such as, for example, a mower, a spreader, a windrow inverter, or a combine harvester. The header 14 may be of generally any suitable construction and design, and may include not-only crop-harvesting mechanisms, but also crop conditioners such as elongate rolls 15. Such attachment of the header 14 to the chassis 16 is achieved through one or more lift arms, which may be a pair of lift arms 18 (only the left one being shown, the right being generally the same), that are movably coupled to the chassis 16. The lift arms 18 may be, for example, pivotably coupled at one end to the chassis 16 and attached at the other end to the header 14. A central upper link 20 may also assist in attaching the header 14 to the chassis. One or more lift actuators, illustrated as a pair of hydraulic cylinders 21, are coupled to the chassis 16 and the lift arms 18 and configured to vertically displace the lift arms 18, as will be described further herein. Vertically displacing the lift arms 18 can cause a corresponding vertical displacement of the attached header 14 to adjust a header height HH of the header 14 relative to, for example, the ground G.

The vehicle 10 may include a prime mover, such as an engine, that propels the vehicle 10 and is controlled by a steering wheel 22 and a multi-function handle (MFH) 24, which is sometimes also referred to as a forward-neutral-reverse (FNR) lever, disposed in an operator cab 26 of the vehicle 10. Operation of the steering wheel 22 and the MFH 24 to control agricultural vehicles is well-known, so further description is omitted for brevity.

A controller 120 is carried by the chassis 16 and operably connected to the lift actuators 21 in order to control the header height HH of the header 14. The controller 120 includes a memory 121 that may store software or other code for controlling various functions of the vehicle 10, including control of the lift actuators 21, as will be described further herein. A display 110 may be disposed in the operator cab 26 and operably coupled to the controller 120. The display 110 may be, for example, a touchscreen display or other type of display that can present various graphics to a user and accept user input. The display 110 may be configured to output various signals to the controller 120, allowing an operator to control various functions of the vehicle 10 via the display 110 and the controller 120, as is known.

The header 14 is illustrated in FIG. 1 as a draper-type header that includes one or more draper belts for conveying cut crop material during operation. The configuration of an exemplary draper-type header is disclosed by U.S. Pat. No. 7,277,785, which is incorporated in its entirety herein by reference. Due to the configuration of the draper-type header 14, the header height HH at which the draper-type header 14 should be lifted while making a turn through headlands is relatively high compared to, for example, a disc-type header or a sickle-type header. An exemplary disc-type header is disclosed by U.S. Pat. No. 8,931,245 and an exemplary sickle-type header is disclosed in U.S. Pat. No. 9,699,959, both of which are incorporated in their entirety herein by reference. In many cases, operating draper-type headers results in relatively large swaths and tall stubble that must be cleared by the header during a turn through headlands at the end of a row, which warrants raising the draper-type header to a greater height compared to a disc-type header or a sickle-type header.

Figure 2:
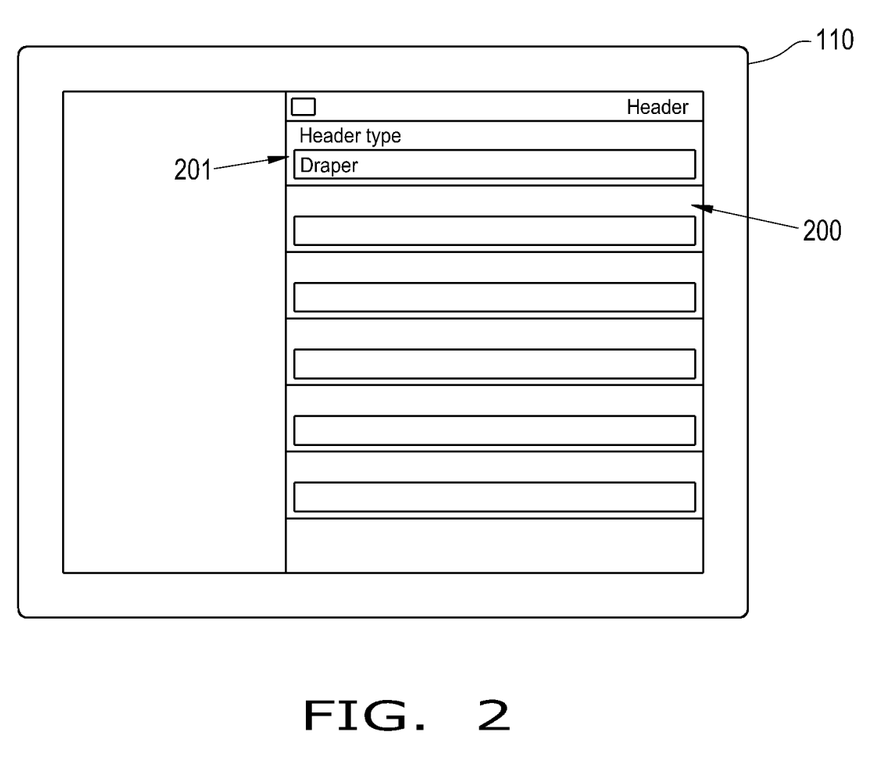
FIG. 2 illustrates an exemplary embodiment of a graphical user interface (GUI) presented on a display of the windrower of FIG. 1 when the header is a draper-type header, in accordance with an exemplary embodiment of the present disclosure.
Figure 3:
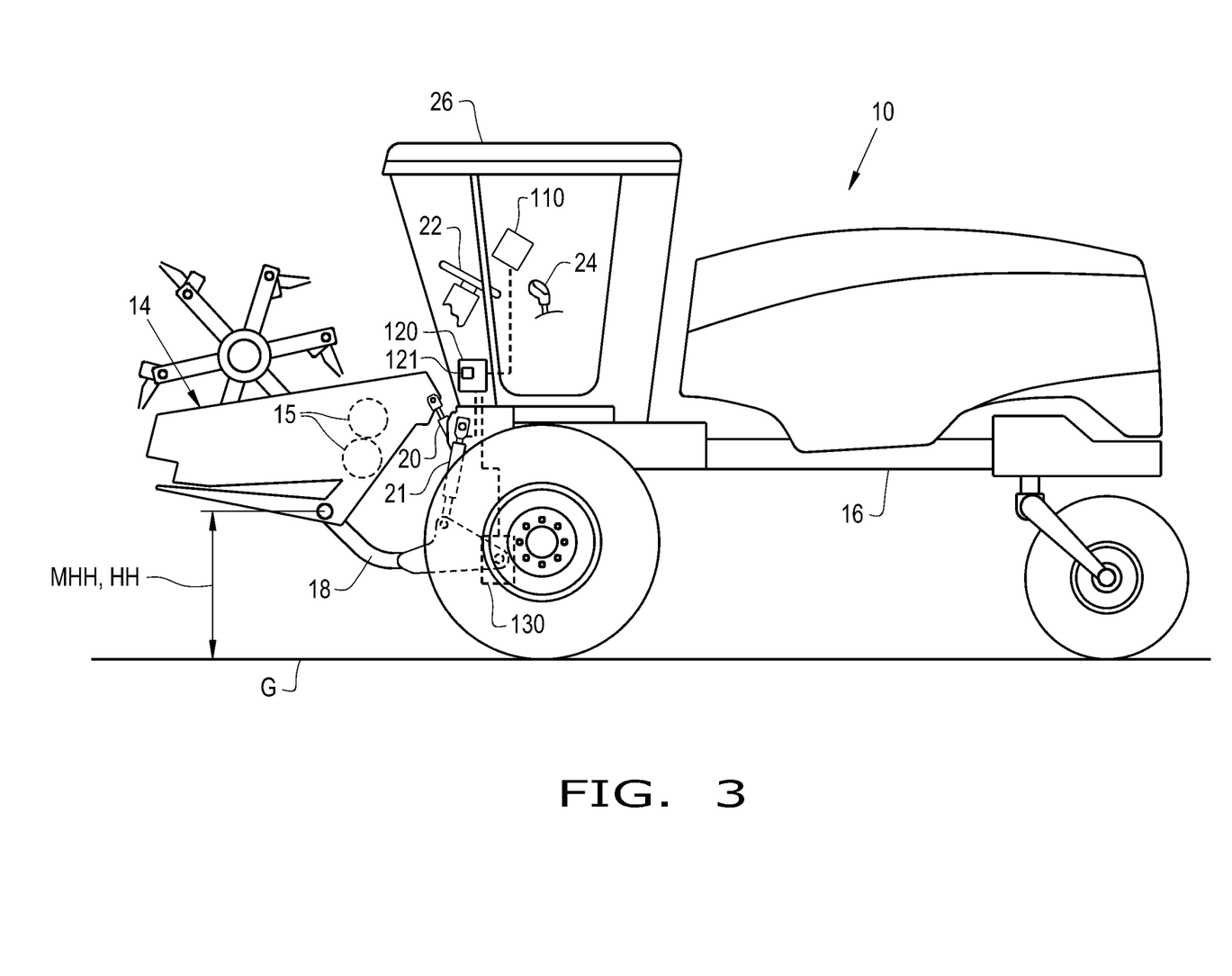
FIG. 3 illustrates the windrower of FIG. 1 after the controller has output a lift signal to lift actuators to vertically displace the header to a first height limit, in accordance with an exemplary embodiment of the present disclosure.

To assist a user in correctly adjusting the header height HH, and referring now also to FIGS. 2-3, the controller 120 is configured to receive a header type signal corresponding to a header type of the header, such as the draper-type header 14, define a lift height limit of the header based at least partially on the received header type signal, and output a lift signal to the at least one lift actuator 21 to vertically displace the header 14. The received header type signal is one of a plurality of header type signals recognized by the controller 120, and includes at least a first header type signal and a second header type signal. In some embodiments, the first header type signal corresponds to when the header 14 is a draper-type header, as illustrated in FIGS. 1 and 3, and the second header type signal corresponds to when the header is a disc-type header or a sickle-type header.

As illustrated in FIG. 2, the controller 120 can receive the header type signal without any additional input from a user and cause the display 110 to present a graphical user interface (GUI) 200 with a header type icon 201 presenting the header type. In the illustrated example of FIG. 2, the header type signal corresponds to the header 14 being a draper-type header, so "Draper" is presented in the header type icon 201. In some embodiments, the controller 120 can receive the header type signal automatically from, for example, an operable coupling to the header 14, which is described further herein, without requiring any user input.

Once the controller 120 has received the header type signal, the controller 120 can define a lift height limit of the header 14 based at least partially on the received header type signal. For example, and referring now also to FIG. 3, when the header 14 is a draper-type header, the controller 120 can define the lift height limit of the header 14 to be a maximum lift height to which the lift arms 18 and lift actuators 21 can vertically displace the header 14. In other words, the controller 120 can be configured to define the lift height limit of the header 14 to be 100% of a maximum header height MHH, illustrated in FIG. 3, that the header 14 can reach. The controller 120 can then output a lift signal to the lift actuators 21 to vertically displace the header 14 to the header height HH, with vertical displacement of the header 14 being limited to the defined lift height limit.

For example, the controller 120 can signal for the lift actuators 21 to vertically lift the lift arms 18, and thus the header 14, until the header 14 reaches the maximum header height MHH, at which point the controller 120 stops outputting the lift signal and/or outputs a lift stop signal to the lift actuators 21 to stop vertical displacement of the header 14 past the defined lift height limit, which is equal to the maximum header height MHH in the example illustrated in FIGS. 2-3. To determine when the header 14 has reached the maximum header height MHH, the controller 120 can be operably coupled to one or more pivot sensors 130 (illustrated in FIG. 1) associated with the lift arms 18 and/or the lift actuators 21 to determine when the lift arms 18 have reached a maximum lift orientation, corresponding to when the header 14 has reached the maximum header height MHH. It should be appreciated that the controller 120 can be configured to limit vertical displacement of the header 14 in other ways, such as by only signaling for the lift actuators 21 to vertically displace the lift arms 18 at a specified rate for a specified amount of time.

Figure 4:
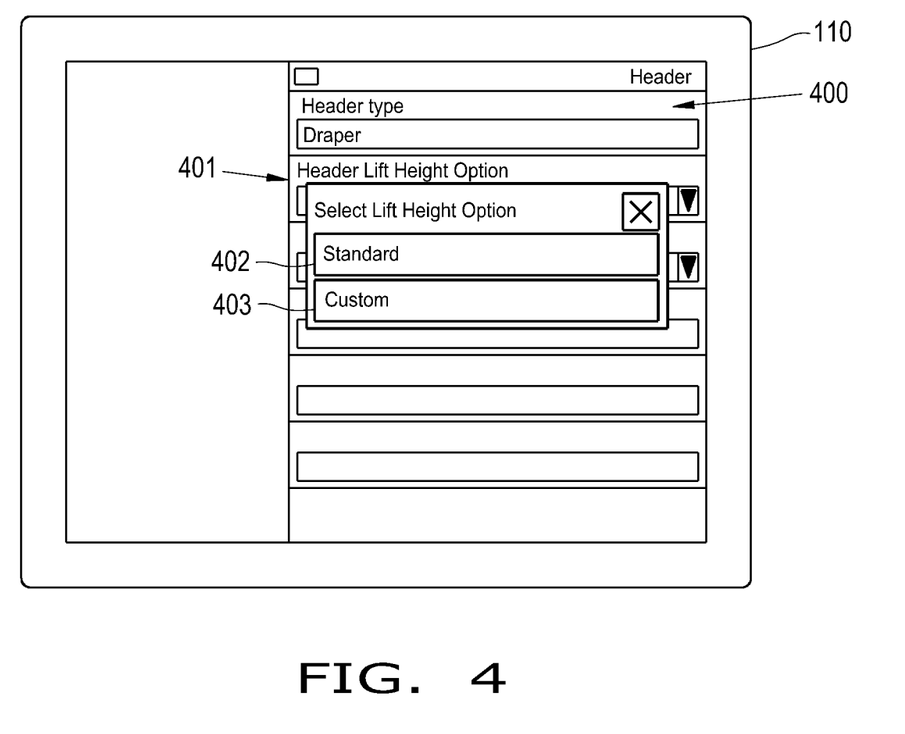
FIG. 4 illustrates a drop-down menu for selecting whether to define a user-defined lift height limit in a GUI presented on the display of the windrower illustrated in FIG. 1, in accordance with an exemplary embodiment of the present disclosure.
Figure 5:
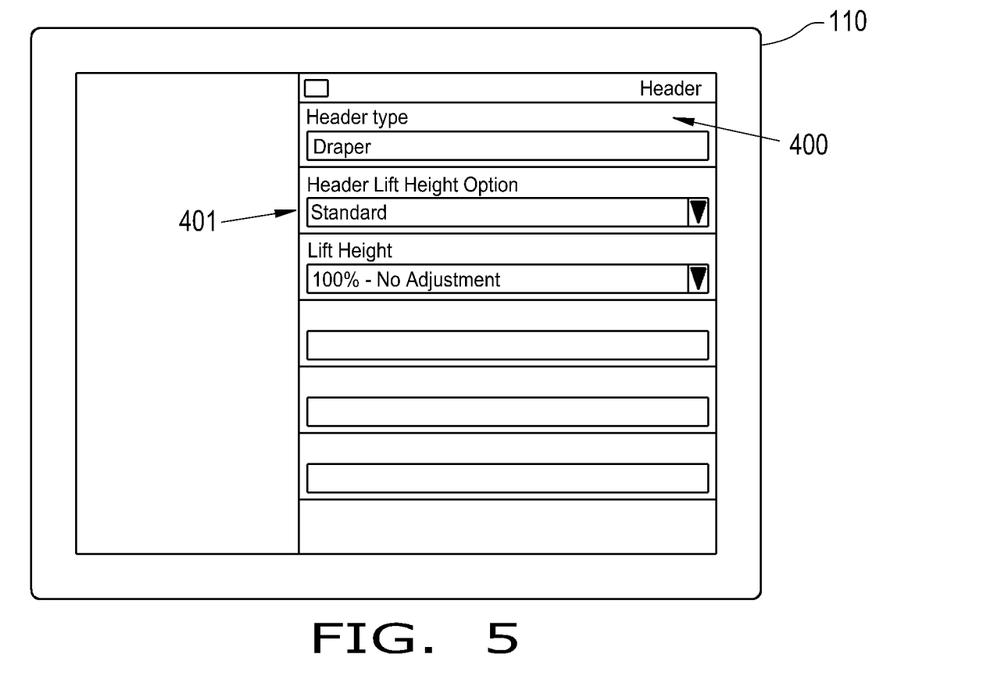
FIG. 5 illustrates the GUI of FIG. 4 when the header type is a draper-type header and the user-defined lift height limit option is not selected, in accordance with an exemplary embodiment of the present disclosure.

Referring now to FIGS. 4-5, another exemplary embodiment of a GUI 400 provided in accordance with the present disclosure is illustrated. Unlike the GUI 200 illustrated in FIG. 2, the GUI 400 presented on the display 110 has a header height option icon 401 that a user can select. As shown in FIG. 4, the header height option icon 401, when selected, can cause the display 110 to display two different options 402, 403. If the user selects the option 402, the display 110 can output a default limit signal to the controller 120 that the defined lift height limit should be a default "Standard" limit, which may be input and stored in the memory 121 prior to operation. When the header is a draper-style header, for example, the "Standard" defined lift height limit can be 100% of the maximum header height MHH, as illustrated in FIG. 5.

Figure 6:
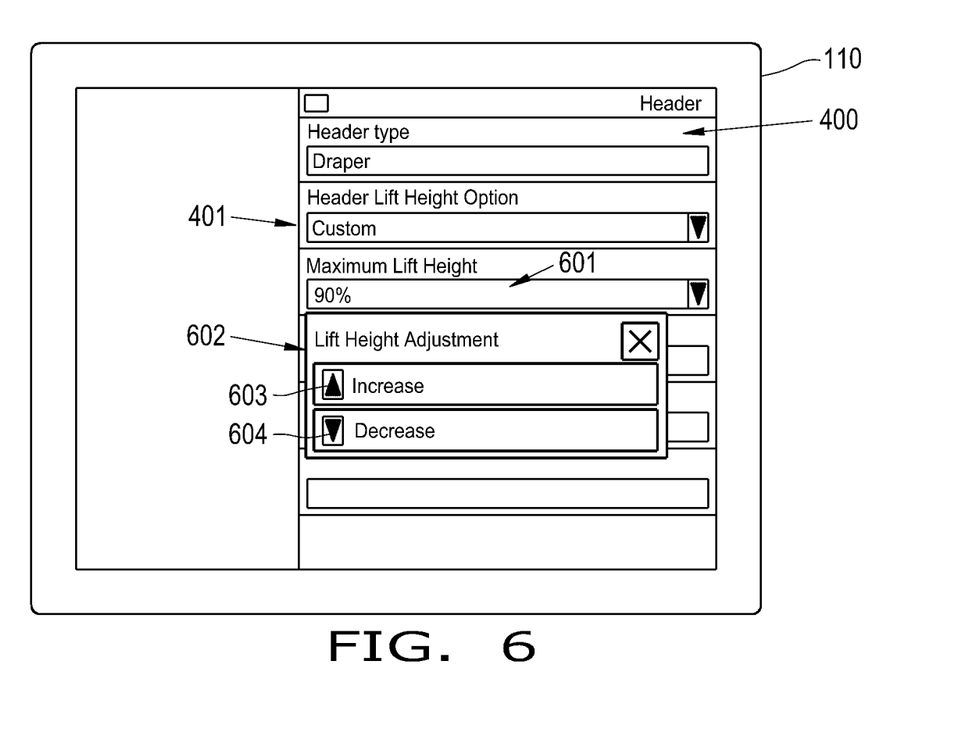
FIG. 6 illustrates the GUI of FIG. 4 when the user-defined lift height limit option is selected to define a user-defined lift height limit, in accordance with an exemplary embodiment of the present disclosure.

Alternatively, if the user selects the option 403, and referring now to FIG. 6 as well, the GUI 400 can present a lift height adjustment icon 601 and call a lift height adjustment menu 602 presenting two options 603, 604 to define a user-defined "Custom" limit. As illustrated in FIG. 6, the lift height adjustment icon 601 can initially present some percentage of the maximum header height MHH, such as 90%, corresponding to the percentage of the maximum header height MHH that the user wishes for the system to lift the header. If the user selects option 603, this would increase the displayed value to, for example, 95%, corresponding to a user-defined lift limit of 95% of the maximum header height MHH. Alternatively, if the user selects option 604, this would decrease the displayed value to, for example, 85%, corresponding to a user-defined lift limit of 85% of the maximum header height MHH.

Figure 7:
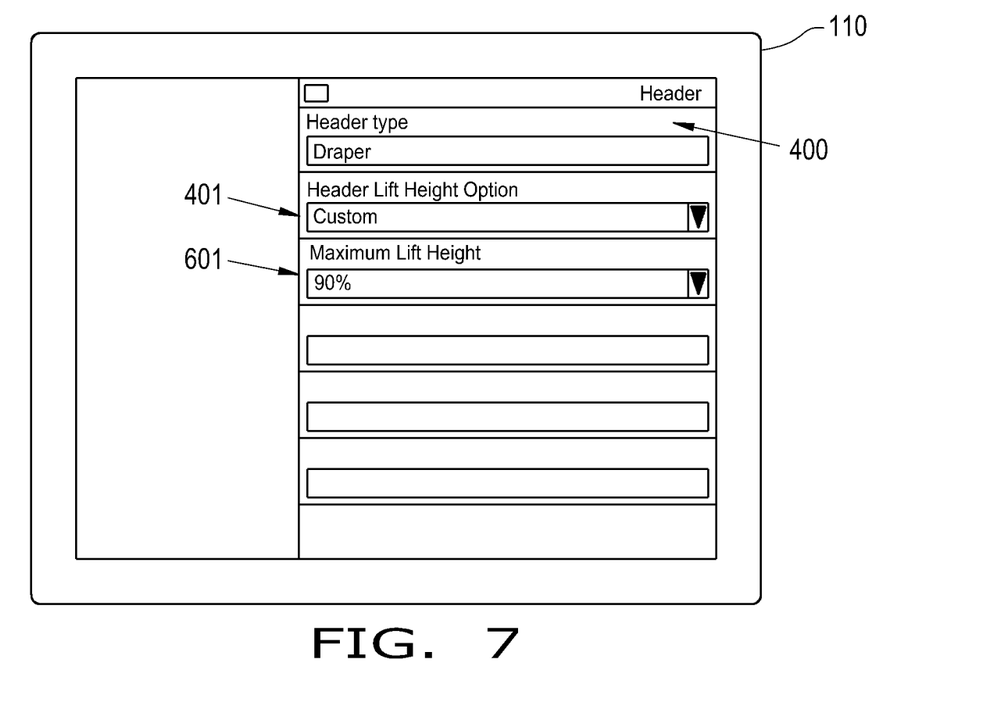
FIG. 7 illustrates the GUI of FIGS. 4-6 after the user-defined lift height limit is selected, in accordance with an exemplary embodiment of the present disclosure.

Regardless of what the final user-defined lift height limit is, and referring now to FIG. 7, the GUI 400 can present the lift height adjustment icon 601 as the corresponding user-defined lift height limit. Once the user has selected the user-defined height limit, the display 110 can output a user-defined height limit signal to the controller 120, which can then define the lift height limit to correspond to the user-defined lift height limit. As illustrated in FIG. 7, the user-defined lift height limit is 90% of the maximum header height MHH, so the defined lift height limit is 90% of the maximum header height MHH. In such an instance, the lift height of the header 14 will be limited to 90% of the maximum header height MHH when the controller 120 outputs the lift signal to the lift actuators 21 to vertically displace the header 14 to the header height HH.

In some embodiments, the controller 120 is configured to restrict how high or how low the user-defined height limit may be. For example, when the controller 120 receives the header type signal corresponding to the draper-type header 14 illustrated in FIGS. 1 and 3, the controller 120 can be configured to set a lower boundary of, for example, 50% of the maximum header height MHH so a user does not inadvertently set the lift height limit to a value that is too low for the draper-type header 14 to clear swaths and stubble during a turn through headlands. Thus, while the controller 120 does take the user-defined height limit signal into account when defining the lift height limit of the header 14, the controller 120 can be configured to limit how customized the user-defined lift height limit is unless, for example, the user prompts for an override signal to be output to the controller 120.

While the header 14 is illustrated in FIGS. 1 and 3 as a draper-type header, a different type of header, such as a disc-type or sickle-type header, can be attached to the agricultural vehicle 10 to cut crops. In such a scenario, it may be more efficient to raise the attached header to a different, lower height when turning through headlands to account for lower clearances being needed. Raising the attached header to a lower height reduces power consumption and time. In known vehicles, the user generally controls the header height by controlling the lift actuator(s) from the operator cab to vertically displace the lift arm(s) so the header is at the desired height. This can be inconvenient for a user, who has to remember what each specific header's desired header height is, and can also result in inefficient operation if the user incorrectly adjusts the header height when changing the header.

Figure 8:
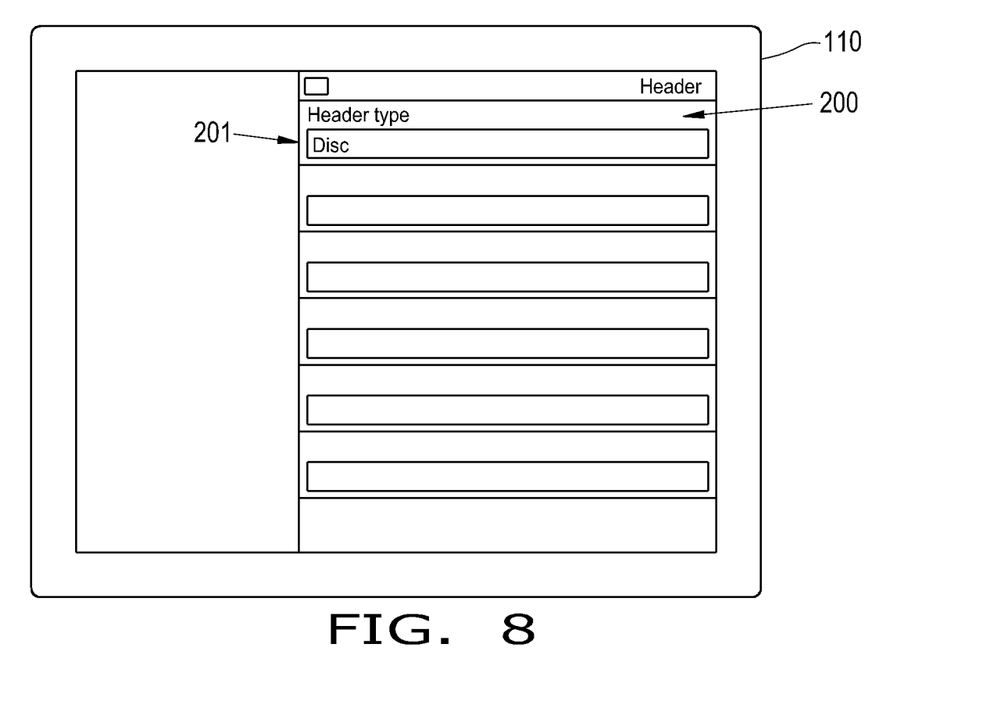
FIG. 8 illustrates the GUI of FIG. 2 when the header is a disc-type header, in accordance with an exemplary embodiment of the present disclosure.
Figure 9:
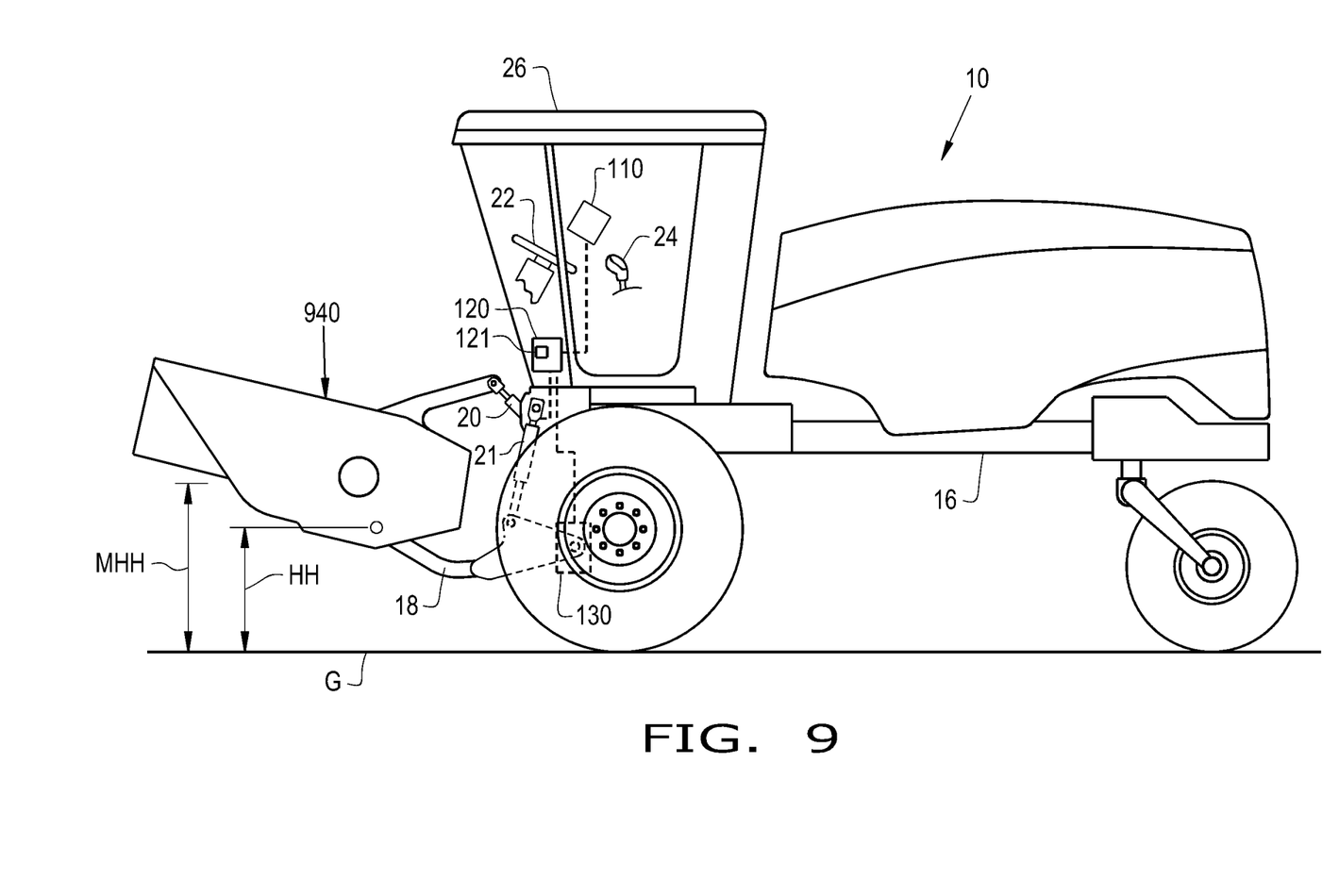
FIG. 9 illustrates the windrower of FIG. 1 when a disc-type header is attached and the controller has output a lift signal to lift actuators to vertically displace the header to a second height limit, in accordance with an exemplary embodiment of the present disclosure.

To assist a user in correctly positioning the header when the header is, for example, a disc-type header, and referring now to FIGS. 8-9, the controller 120 is configured to define the lift height limit differently, based at least partially on the received header type signal. As previously described, the controller 120 may receive the first header type signal when the header 14 is a draper-type header. When a different type of header, such as a disc-type header 940 illustrated in FIG.

9, is attached to the agricultural vehicle 10, the controller 120 instead receives a second header type signal, which corresponds to the header 940 being a disc-type header. In some embodiments, the controller 120 can automatically receive the header type signal without the need for user input, as previously described. As illustrated in FIG. 8, the GUI 200 presented on the display 110 can then display that the header 940 is a disc-type header, with no user input needed.

When the controller 120 receives the second header type signal, the controller 120 defines the lift height limit to be a second height limit that is a different value than is defined by the first height limit defined when receiving the first header type signal. In the illustrated example, the first height limit value is greater than the second height limit value so, when the header is a draper-type header, the defined lift height limit is greater than the defined lift height limit when the header is, for example, a disc-type or sickle-type header. It should be appreciated that the "first" header type signal and the "second" header type signal do not refer to when the controller 120 receives the header type signal, i.e., the controller 120 can receive the second header type signal before receiving the first header type signal and define the corresponding height limit. The controller 120 can output a lift signal to the lift actuators 21 to vertically displace the disc-type header 940 to a header height HH, with vertical displacement of the disc-type header 940 being limited to the second height limit (illustrated in FIG. 9) because the second header type signal is received by the controller 120. The second height limit may be, for example, 85% of the maximum header height MHH, which generally does not significantly change when a different header is attached to the lift arms 18, so the header 940 is vertically displaced no further than 85% of the maximum header height MHH when the controller 120 outputs the lift signal to the lift actuators 21 after receiving the second header type signal.

Figure 10:
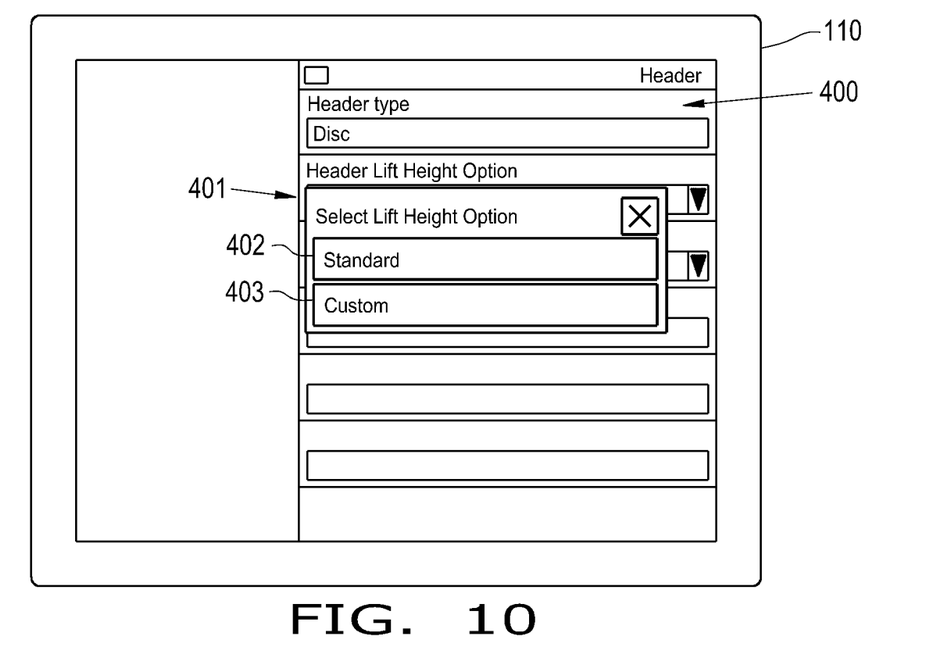
FIG. 10 illustrates a drop-down menu for selecting whether to define a user-defined lift height limit in the GUI illustrated in FIG. 4 when the windrower has the attached disc-type header illustrated in FIG. 9, in accordance with an exemplary embodiment of the present disclosure.
Figure 11:
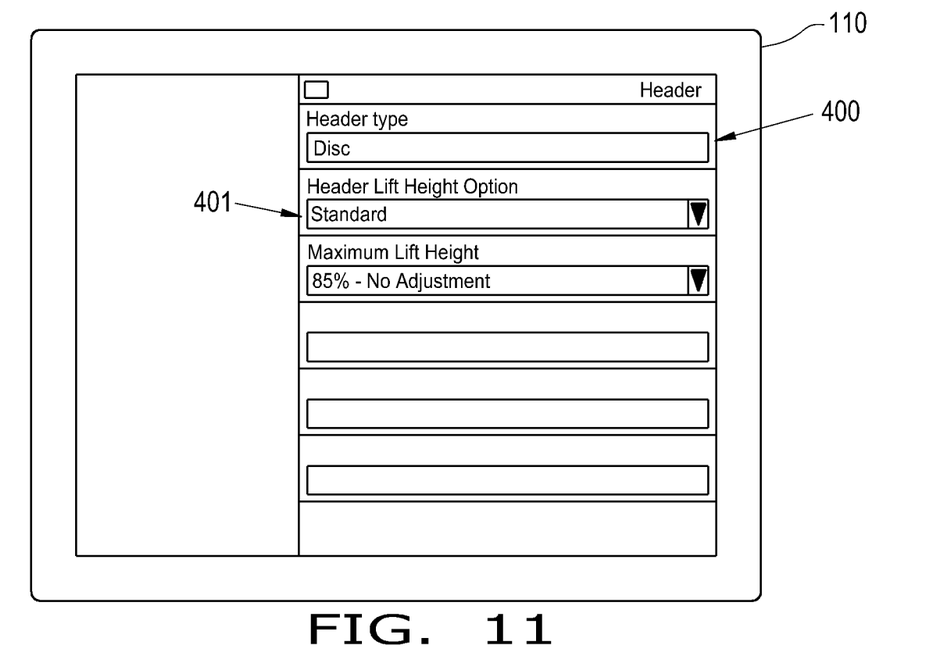
FIG. 11 illustrates the GUI of FIG. 10 when the header type is a disc-type header and the user-defined lift height limit option is not selected, in accordance with an exemplary embodiment of the present disclosure.

It should be appreciated that the previously described second height limit is exemplary only and may be adjusted, similarly to the first height limit as previously described. Referring now to FIGS. 10-13, it is illustrated how the second height limit may be adjusted by a user-defined height limit signal that is output to the controller 120 by the display 110. As illustrated in FIG. 10, the GUI 400 previously illustrated in FIG. 4 may present the header height option icon 401, which presents options 402 and 403 when selected. In this respect, the only substantial change in the GUI 400 is that the word "Disc" is displayed in the "Header type" box to correspond to the attached header 940 being a disc-type header. If the user selects option 402 to choose the "Standard", i.e., default, second height limit, the GUI 400 may display this (illustrated in FIG. 11) and output a default height signal to the controller 120. The controller 120 may then define the second lift height limit to be 85% of the maximum header height MHH, as previously described.

Figure 12:
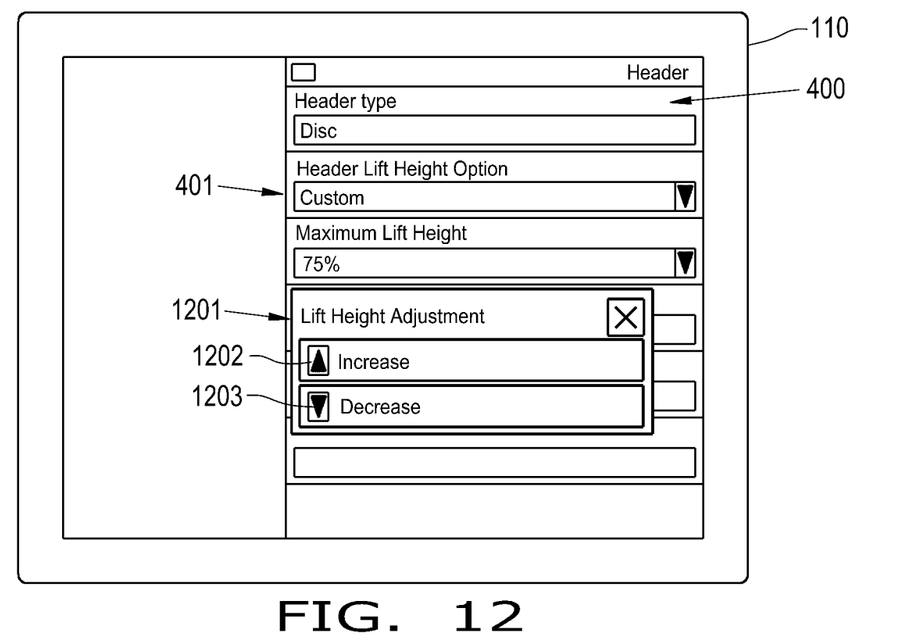
FIG. 12 illustrates the GUI of FIG. 10 when the user-defined lift height limit option is selected to define a user-defined lift height limit, in accordance with an exemplary embodiment of the present disclosure.
Figure 13:
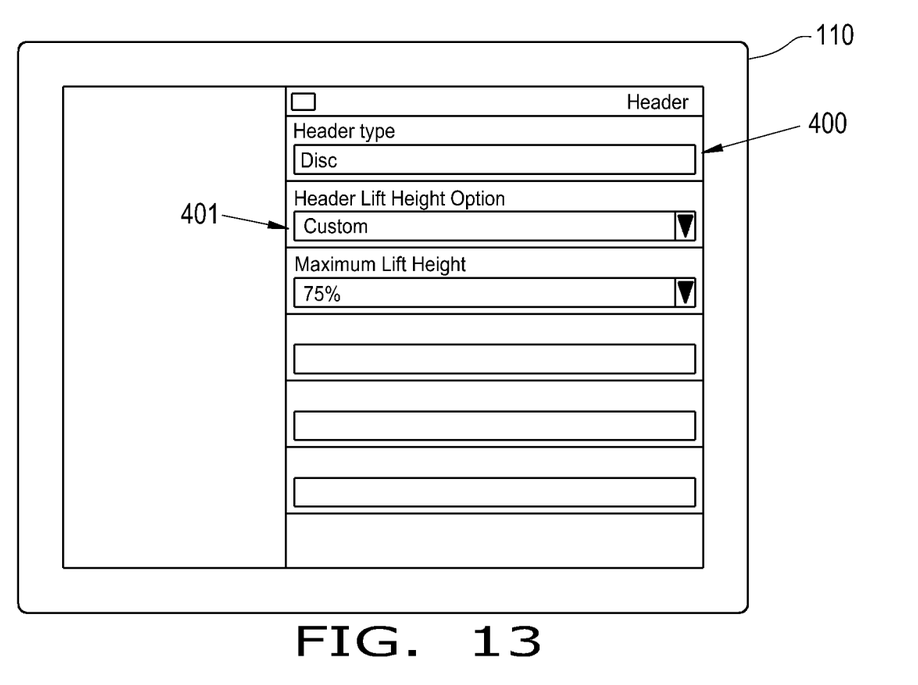
FIG. 13 illustrates the GUI of FIGS. 10-12 after the user-defined lift height limit is selected, in accordance with an exemplary embodiment of the present disclosure.

If the user selects option 403 to choose the "Custom", i.e., user-defined, second height limit, the GUI 400 may then present a lift height adjustment window 1201, as illustrated in FIG. 12, which results in two options 1202 and 1203 being presented. The user may select option 1202 to increase the defined lift height limit or, alternatively, select option 1203 to decrease the defined lift height limit. Once the user-defined lift height limit is chosen, as illustrated in FIG. 13, the display 110 can output the user-defined height limit signal to the controller 120, which can then define the lift height limit by taking into account the header type signal and the user-defined height limit signal. In the example illustrated in FIG. 13, the user-defined lift height limit is 75%, so the controller 120 can define the lift height limit to be 75% of the maximum header height MHH so vertical displacement of the header 940 to the header height HH does not go further than this value. As previously described with respect to the draper-type header, the controller 120 can also set upper and lower boundaries for what the user-defined lift height limit may be for when the header 940 is a disc-type header. For example, the controller 120 can set a lower boundary of 40% of the maximum header height MHH for the second height limit and an upper boundary of 85% of the maximum header height MHH, but it should be appreciated that these values are exemplary only and can be changed depending on the configuration of the vehicle 10. It should be appreciated that the lower boundary can be set to values different than 40%, bearing in mind that the lower boundary should generally be high enough to prevent the header 940 from regularly hitting ground obstacles when lifted because the header 940 does not "float" when lifted.

From the foregoing, it should be appreciated that the agricultural vehicle 10 with the controller 120 provided in accordance with the present disclosure can define different header lift height limits based at least partially on the header type that is attached to the vehicle 10. By defining different header lift height limits for different headers, the controller 120 can assist a user in raising and lowering the attached header to a header height that promotes efficient raising of the attached header while making a turn through headlands when the vehicle 10 reaches the end of a row. By incorporating this functionality in the controller 120, a user does not need to remember what height each header type needs to be raised to in order to clear the headlands. Further, the controller 120 can prevent unnecessary and/or excessive raising of the attached header to save energy.

Figure 14:
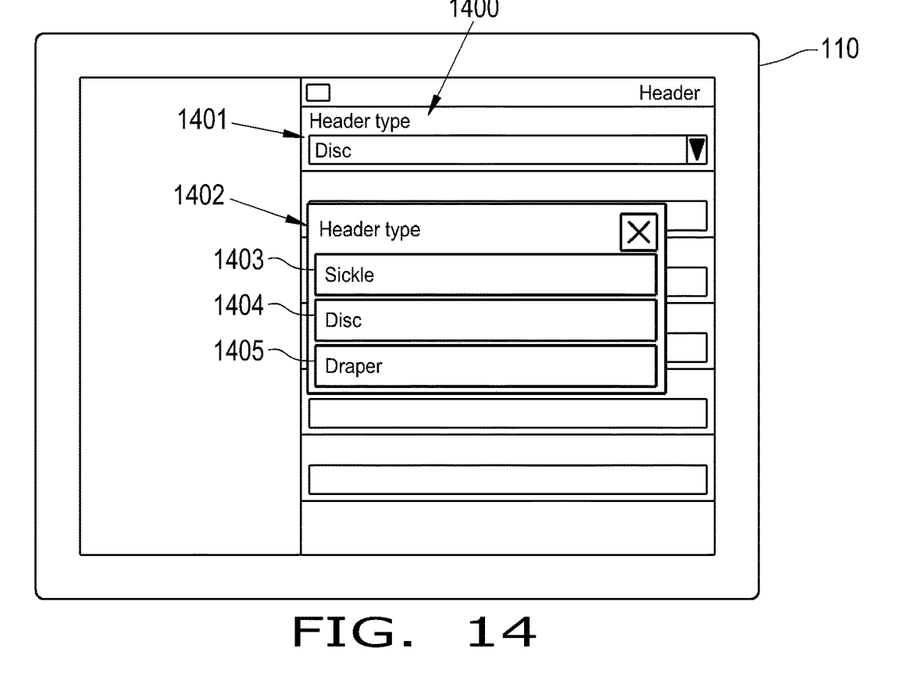
FIG. 14 illustrates an exemplary embodiment of a GUI presented on the display of the windrower of FIG. 1 presenting a plurality of header choice icons for selection, in accordance with an exemplary embodiment of the present disclosure.

Referring now to FIG. 14, another exemplary embodiment of a GUI 1400 that may be presented on the display 110 is illustrated. Unlike the previous GUIs 200, 400, which have the "Header type" field populated automatically by the controller 120, the GUI 1400 presents a header selection icon 1401 that calls a header selection menu 1402 when selected. The header selection menu 1402 may present three options 1403, 1404, 1405, with the display 110 being configured to output a different corresponding header type signal when each option 1403, 1404, 1405 is selected. For example, when the option 1403 is selected, the display 110 outputs a sickle header type signal to the controller 120, which may then define the lift height limit of the attached header at least partially based on the header being a sickle-type header. The display 110 can also output a disc header type signal when the option 1404 is selected or a draper header type signal when the option 1405 is selected. It should thus be appreciated that the GUI 1400 allows a user to manually select the header type that is attached to the vehicle 10, with the display 110 then outputting a corresponding header type signal to the controller 120 for defining the lift height limit.

Figure 15:
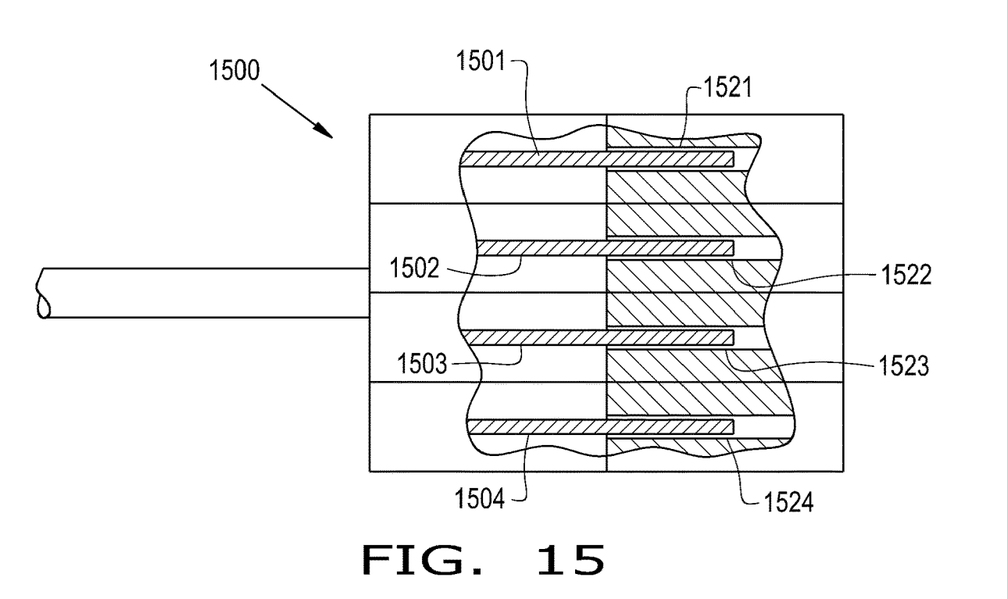
FIG. 15 illustrates a controller connector of the header of the windrower of FIG. 1 including a header type signal pin placed in a controller slot of the controller.

Referring now to FIG. 15, an exemplary embodiment of a controller connector 1500 that may be used to connect a header, such as the header 14 of FIG. 1, to the controller 120 is illustrated. The connector 1500 may include multiple pins 1501, 1502, 1503, 1504, that each electrically couple to a corresponding header type pin slot 1521, 1522, 1523, 1524 of the controller 120. One of the pins, such as the pin 1504, may be a header type signal pin that is electrically coupled to a header type pin slot 1524 and provides a signal pathway for the header 14 to output the header type signal to the controller 120. In other words, the header 14 can output the header type signal to the controller 120 via the header type signal pin 1504, allowing the controller 120 to automatically receive the header type signal and define the lift height limit without requiring user input. It should be appreciated that while a wired connection between the header 14 and the controller 120 is illustrated, the header 14 can also connect to the controller 120 wirelessly, if desired.

Figure 16:
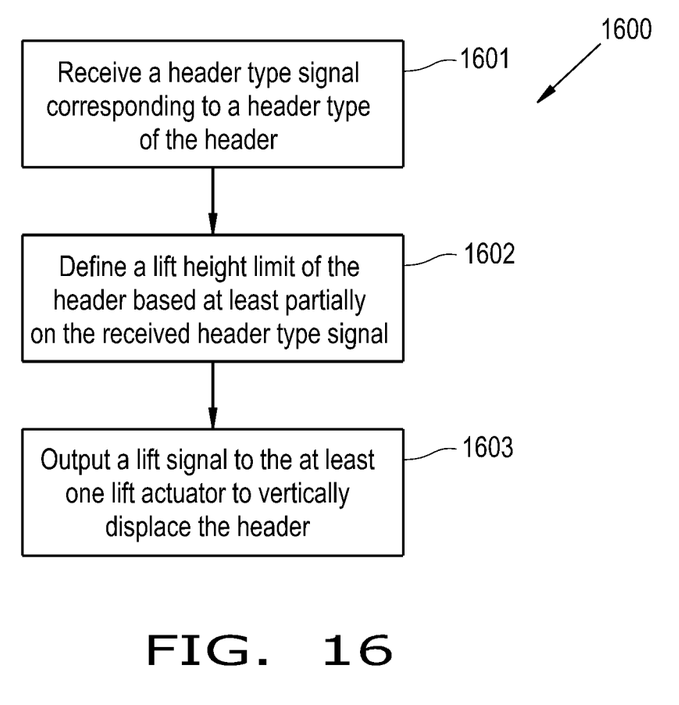
FIG. 16 is a flow chart illustrating a method of adjusting a header height of a header of an agricultural vehicle, in accordance with an exemplary embodiment of the present disclosure.

Referring now to FIG. 16, an exemplary embodiment of a method 1600 of adjusting a header height of a header 14, 940 of an agricultural vehicle 10 is illustrated. The agricultural vehicle 10 includes a chassis 16, at least one lift arm 18 movably coupled to the chassis 16 and the header 14, 940, at least one lift actuator 21 coupled to the at least one lift arm 18, and a controller 120 operably coupled to the at least one lift actuator 21. The method 1600 is performed by the controller 120 and includes receiving 1601 a header type signal corresponding to a header type of the header 14, 940, defining 1602 a lift height limit of the header 14, 940 based at least partially on the received header type signal, and outputting 1603 a lift signal to the lift actuator(s) 21 to vertically displace the header 14, 940. The received header type signal is one of a plurality of header type signals that includes at least a first header type signal, which may correspond to, for example, a draper-type header, and a second header type signal, which may correspond to, for example, a disc-type header. It should be appreciated that the first header type signal or second header type signal may correspond to other types of headers, such as a sickle-type header. The defined lift height limit is a first height limit when the first header type signal is received or a second height limit when the second header type signal is received. The first height limit is greater than the second height limit. When the controller 120 outputs 1603 the lift signal to the lift actuators 21, the header 14, 940 is vertically displaced. Vertical displacement of the header 14, 940 by the lift arms 18 and lift actuators 21 is limited to the first height limit if the first header type signal is received or to the second height limit if the second header type signal is received.

In some embodiments, the controller 120 receives 1601 the header type signal via an electrical coupling with the header 14, 940, such as the previously described controller connector 1500. Alternatively, the controller 120 may receive 1601 the header type signal from a display 110 that is operably coupled to the controller 120. The first height limit and the second height limit may be adjusted to provide efficient operation for each header type. For example, when the first header type signal corresponds to a draper-type header 14, the first height limit may be approximately 90% to 100% of a maximum header height MHH of the header 14. When the second header type signal corresponds to a disc-type header 940, the second height limit may be approximately 65% to 85% of the maximum header height MHH. It should be appreciated that these header heights are exemplary only, and different header heights may be utilized for different header types and crop conditions. In some embodiments, the first height limit and the second height limit are also partially based on a user-defined lift height limit signal, which may be output to the controller 120 by the display 110. Thus, it should be appreciated that the defined lift height limits and the manner of setting the lift height limits may be modified depending on, for example, the configuration of the agricultural machine 10 and/or user preference.

It is to be understood that the steps of the method 1600 are performed by the controller 120 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 120 described herein, such as the method 1600, is implemented in software code or instructions which are tangibly stored on a tangible computer readable medium. The controller 120 loads the software code or instructions via a direct interface with the computer readable medium or via a wired and/or wireless network. Upon loading and executing such software code or instructions by the controller 120, the controller 120 may perform any of the functionality of the controller 120 described herein, including any steps of the method 1600 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
 a chassis;
 at least one lift arm movably coupled to the chassis;
 at least one lift actuator coupled to the at least one lift arm and configured to vertically displace the at least one lift arm;
 a header coupled to the at least one lift arm such that vertical displacement of the at least one lift arm vertically displaces the header; and
 a controller operably coupled to the at least one lift actuator, the controller being configured to:
  receive a header type signal corresponding to a header type of the header, the header type including a first header type and a second header type different from the first header type, the received header type signal being one of a plurality of header type signals comprising at least a first header type signal and a second header type signal, the first header type signal corresponding to the first header type and contains a maximum header height for the first header type, the second header type signal corresponding to the second header type and contains a maximum header height for the second header type that is different than the maximum header height for the first header type;
  define a lift height limit of the header based at least partially on the received header type signal, the defined lift height limit being a first height limit when the first header type signal is received or a second height limit when the second header type signal is received, the first height limit being greater than the second height limit, the first height limit being less than the maximum header height for the first header type, and the second height limit being less than the maximum header height for the second header type; and output a lift signal to the at least one lift actuator to vertically displace the header, wherein vertical displacement of the header is limited to the first height limit if the first header type signal is received or to the second height limit if the second header type signal is received.

2. The agricultural vehicle of claim 1, wherein the header is operably coupled to the controller and configured to output the header type signal to the controller.

3. The agricultural vehicle of claim 2, wherein the controller comprises a header type pin slot and the header comprises a header type signal pin electrically coupled to the header type pin slot, the header being configured to output the header type signal to the controller via the header type signal pin.

4. The agricultural vehicle of claim 1, further comprising a display operatively coupled to the controller.

5. The agricultural vehicle of claim 4, wherein the display is configured to output a user-defined lift height limit signal to the controller, the controller being configured to define the lift height limit based at least partially on the user-defined lift height limit signal.

6. The agricultural vehicle of claim 5, wherein the display is configured to present a graphical user interface (GUI) displaying a plurality of header choice icons, each of the header choice icons corresponding to a respective header type signal that is output to the controller upon being selected.

7. The agricultural vehicle of claim 1, wherein the at least one lift actuator is configured to vertically displace the at least one lift arm to a maximum lift arm height, the header being at a maximum header height when the at least one lift arm is at the maximum lift arm height.

8. The agricultural vehicle of claim 1, wherein the first height limit is approximately 90% to 100% of the maximum header height of the first header type.

9. The agricultural vehicle of claim 8, wherein the second height limit is approximately 65% to 85% of the maximum header height of the second header type.

10. The agricultural vehicle of claim 1, wherein the first header type signal corresponds to the header type being a draper-type header and the second header type signal corresponds to the header type being a disc-type header or a sickle-type header.

11. A method of adjusting a header height of a header of an agricultural vehicle, the agricultural vehicle comprising a chassis, at least one lift arm movably coupled to the chassis and the header, at least one lift actuator coupled to the at least one lift arm, and a controller operably coupled to the at least one lift actuator, the method being performed by the controller and comprising:

receiving a header type signal corresponding to a header type of the header, the header type including a first header type and a second header type different from the first header type, the received header type signal being one of a plurality of header type signals comprising at least a first header type signal and a second header type signal, the first header type signal corresponding to the first header type and contains a maximum header height for the first header type, the second header type signal corresponding to the second header type and contains a maximum header height for the second header type that is different than the maximum header height for the first header type;

defining a lift height limit of the header based at least partially on the received header type signal, the defined lift height limit being a first height limit when the first header type signal is received or a second height limit when the second header type signal is received, the first height limit being greater than the second height limit, the first height limit being less than the maximum header height for the first header type, and the second height limit being less than the maximum header height for the second header type; and outputting a lift signal to the at least one lift actuator to vertically displace the header, wherein vertical displacement of the header is limited to the first height limit if the first header type signal is received or to the second height limit if the second header type signal is received.

12. The method of claim 11, wherein the header is operably coupled to the controller and configured to output the header type signal to the controller.

13. The method of claim 12, wherein the controller comprises a header type pin slot and the header comprises a header type signal pin electrically coupled to the header type pin slot, the header being configured to output the header type signal to the controller via the header type signal pin.

14. The method of claim 11, wherein the agricultural vehicle further comprises a display operatively coupled to the controller.

15. The method of claim 14, wherein the display is configured to output a user-defined lift height limit signal to the controller, the controller being configured to define the lift height limit based at least partially on the user-defined lift height limit signal.

16. The method of claim 15, wherein the display is configured to present a graphical user interface (GUI) displaying a plurality of header choice icons, each of the header choice icons corresponding to a respective header type signal that is output to the controller upon being selected.

17. The method of claim 11, wherein the at least one lift actuator is configured to vertically displace the at least one lift arm to a maximum lift arm height, the header being at a maximum header height when the at least one lift arm is at the maximum lift arm height.

18. The method of claim 11, wherein the first height limit is approximately 90% to 100% of the maximum header height of the first header type.

19. The method of claim 18, wherein the second height limit is approximately 65% to 85% of the maximum header height of the second header type.

20. The method of claim 11, wherein the first header type signal corresponds to the header type being a draper-type header and the second header type signal corresponds to the header type being a disc-type header or a sickle-type header.

* * * * *